United States Patent
Zhang et al.

(10) Patent No.: US 9,020,780 B2
(45) Date of Patent: Apr. 28, 2015

(54) MOTION DETECTOR MODULE

(75) Inventors: James Zhang, Vineland, NJ (US);
William K. Krug, Rockville, MD (US)

(73) Assignee: The Nielsen Company (US), LLC,
Schaumburg, IL (US)

(*) Notice: Subject to any disclaimer, the term of this patent is extended or adjusted under 35 U.S.C. 154(b) by 366 days.

(21) Appl. No.: 12/006,442

(22) Filed: Dec. 31, 2007

(65) Prior Publication Data

US 2009/0171616 A1 Jul. 2, 2009

(51) Int. Cl.

| | |
|---|---|
| *G06F 17/40* | (2006.01) |
| *H04H 60/33* | (2008.01) |
| *H04H 60/56* | (2008.01) |
| *G01P 13/00* | (2006.01) |
| *G01P 1/12* | (2006.01) |
| *G01P 15/00* | (2006.01) |
| *G06Q 30/02* | (2012.01) |
| *H04H 60/31* | (2008.01) |
| *H04H 60/41* | (2008.01) |

(52) U.S. Cl.
CPC ............... *G01P 13/00* (2013.01); *G01P 1/127* (2013.01); *G01P 15/00* (2013.01); *G06Q 30/02* (2013.01); *H04H 60/31* (2013.01); *H04H 60/33* (2013.01); *H04H 60/41* (2013.01)

(58) Field of Classification Search
CPC ..................... G06K 19/07732; G06F 13/385
USPC ............ 702/141, 187–188; 725/9–10, 12, 14
See application file for complete search history.

(56) References Cited

U.S. PATENT DOCUMENTS

| | | | |
|---|---|---|---|
| 5,483,276 A | 1/1996 | Brooks et al. | |
| 6,045,513 A | 4/2000 | Stone et al. | |
| 6,067,460 A * | 5/2000 | Alanara et al. | 455/574 |
| 7,064,670 B2 * | 6/2006 | Galperin et al. | 340/573.4 |
| 7,424,175 B2 * | 9/2008 | Lipton et al. | 382/294 |
| 2004/0034294 A1 * | 2/2004 | Kimball et al. | 600/323 |
| 2006/0105817 A1 | 5/2006 | Naick et al. | |
| 2007/0107008 A1 * | 5/2007 | Dybus | 725/9 |
| 2007/0262857 A1 * | 11/2007 | Jackson | 340/506 |
| 2007/0297028 A1 | 12/2007 | Wulff et al. | |
| 2008/0059988 A1 * | 3/2008 | Lee et al. | 725/9 |
| 2008/0161951 A1 * | 7/2008 | Morris | 700/94 |
| 2008/0272902 A1 * | 11/2008 | Kang et al. | 340/506 |
| 2008/0318626 A1 * | 12/2008 | Rofougaran | 455/556.1 |
| 2008/0319666 A1 * | 12/2008 | Petrov et al. | 701/213 |

FOREIGN PATENT DOCUMENTS

| | | |
|---|---|---|
| EP | 1617629 | 1/2006 |
| EP | 1868352 | 12/2007 |
| WO | WO-2006/099612 | 9/2006 |

OTHER PUBLICATIONS

Linehart et al. "A System for Reliable Dissolve Detection in Videos," 2001. pp. 406-409.*

(Continued)

*Primary Examiner* — Janet Suglo
(74) *Attorney, Agent, or Firm* — Hanley, Flight & Zimmerman, LLC (57) ABSTRACT

In a data acquisition system a sensor module includes a motion sensor and a communication controller. The motion sensor and communication controller are prepared in a form factor adapted to be received within, or otherwise readily used with, the user appliance. A data signal produced by the motion sensor is adaptable for compliance validation.

26 Claims, 8 Drawing Sheets

(56) References Cited

OTHER PUBLICATIONS

Feb. 8, 2007—SD Specifications Part E1 SDIO Simplified Specfication Version 2.00.*

Trevor Pering et al., The PSI Board: Realizing a Phone-Centric Body Sensor Network, IFMBE Proceedings—4th International Workshop on Wearable and Implantable Body Sensor Networks (BSN 2007), 2007, 53-58, vol. 13, Publisher: Springer Berlin Heidelberg, Published in: US.

International Search Authority (US), Written Opinion and International Search Report, issued Mar. 3, 2009, in connection with PCT/US2008/014143 (7 pages).

Australian Patent Office, Patent Examination Report No. 1, issued on Jun. 27, 2013 in connection with Australian Patent Application No. 2008343712 (3 pages).

IP Australia, "Patent Examination Report No. 2," issued in connection with Application No. 2008343712, Mar. 31, 2014, 4 pages.

European Patent Office, "Extended European Search Report," issued in connection with Application No. 08866166.5, Apr. 29, 2014, 6 pages.

* cited by examiner

MOTION DETECTOR MODULE

FIELD OF THE INVENTION

The present invention relates to data acquisition, and more particularly to data acquisition from an appliance environment.

BACKGROUND

Efforts to gauge and improve the effectiveness of communication activities, such as advertising activities, have long relied on gathering data from audience survey participants. Traditionally, such data gathering has involved the manual recording of media content consumption patterns by survey participants in participant diaries. Audience surveys have been conducted by providing selected and consenting members with record diaries and requiring that the audience members record their media consumption periodically over a particular time span. Unfortunately, survey participants often prove unreliable in their ability to maintain complete and accurate records of their media consumption activities. Record diaries may be forgotten or lost and, even when remembered, the significant discipline required to maintain accurate written records on a regular basis may be lacking. The metric of survey participant adherence to the data collection protocol of a survey is termed "compliance."

More recently, the development of miniaturized electronic technologies has permitted the automation of some data collection functions useful in the study of audience media consumption. Compliance is generally improved by such automation of data collection. The most sophisticated automated systems, however, still require positive action by survey participants to enable full compliance with survey protocols. In particular, existing data sensing and collection devices require periodic battery charging, data transfer connection and, most fundamentally, require that the survey participant carry the data sensing a collection device on his or her person. In practice, compliance is therefore limited by the willingness or capacity of the survey participant to properly remember and employ a Monitoring device.

Consequently, despite various advances, effectively capturing complete and accurate information regarding audience media consumption remains difficult. Despite the ongoing efforts of many creative practitioners of skill in the art, this problem has remained unsolved until now.

SUMMARY

Collecting data reflecting usage of media is rendered difficult by technical and human factors. As the variety of media sources and techniques for presenting media to consumers, and the numbers and types of media presentation venues, increase over time, the volume and scope of usage data to be collected increases. Concurrently this expansion of available information, and other daily demands, serves diminish available time and otherwise demotivate survey participants from providing data through conventional channels.

Dedicated portable Monitoring devices have been developed including the hardware and software required to Monitor exposure to audio media. In the course of developing the present invention, the inventors have understood the limitations of such dedicated Monitoring devices including device expense, limited user interface and processing facilities, and difficulties and costs associated with the process of upgrading Monitoring devices. In addition, through diligent effort in the inventors have developed compliance incentives where other creative practitioners using dedicated portable Monitoring devices have failed.

Accordingly, in one representative embodiment, the invention includes a Personal User Appliance (an appliance) and a sensor module adapted to be disposed within the appliance. According to one embodiment, the appliance is a mobile device, such as a cellular phone or a PDA style Smart-Phone. In one embodiment, the sensor module includes an accelerometer adapted to produce an acceleration signal corresponding to motion of the appliance-sensor module system. In one embodiment the accelerometer is adapted to detect motion related to the appliance-sensor module system being carried by a user. In still another embodiment of the invention, a signal indicating that the appliance-sensor module is being carried by user is correlated to validity of survey data. In a further embodiment of the invention, compliance by a survey participant is correlated to a reward or other benefit.

In one embodiment of the invention, the sensor module is integrated within a particular device form factor. In one embodiment the device form factor complies with a form factor specification for an SD chip. In another embodiment of the invention, the device form factor complies with a mini-SD chip form factor. In still another embodiment of the invention, the device form factor complies with a micro-SD chip form factor. At various points within the following discussion the term SD chip may be used to refer generically to any of the above-form factors. In other embodiments of the invention, the device form factor includes a modified SD chip form factor and another embodiment of the invention, the device form factor is adapted to comply with a battery module form factor.

In various embodiments of the invention, a signal related to survey data validity and/or compliance is received at a remote location from an appliance over a communications network such as a cellular telephone network. In another embodiment of the invention, a device other than an appliance is adapted to receive stored compliance data from a sensor module.

These and other advantages and features of the invention will be more readily understood in relation to the following detailed description of the invention, which is provided in conjunction with the accompanying drawings.

DETAILED DESCRIPTION

Having carefully considered the factors discussed above and, from this consideration, having developed a new understanding of the underlying problems and conditions, the inventors have arrived at new and effective solutions embodied in the invention as described below. This description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present inventions.

Various terms relied upon in disclosing the present invention are defined as follows:

The terms "first," "second," "primary," and "secondary" are used herein to distinguish one element, set, data, object, step, process, function, action or thing from another, and are not used to designate relative position, arrangement in time or relative importance, unless otherwise stated explicitly.

The terms "coupled", "coupled to", and "coupled with" as used herein each mean a relationship between or among two or more devices, apparatus, files, circuits, elements, functions, operations, processes, programs, media, components, networks, systems, subsystems, and/or means, constituting any one or more of (a) a connection, whether direct or through one or more other devices, apparatus, files, circuits, elements, functions, operations, processes, programs, media, components, networks, systems, subsystems, or means, (b) a communications relationship, whether direct or through one or more other devices, apparatus, files, circuits, elements, functions, operations, processes, programs, media, components, networks, systems, subsystems, or means, and/or (c) a functional relationship in which the operation of any one or more devices, apparatus, files, circuits, elements, functions, operations, processes, programs, media, components, networks, systems, subsystems, or means depends, in whole or in part, on the operation of any one or more others thereof.

The terms "communicate", and "communicating" as used herein include both conveying data from a source to a destination, and delivering data to a communications medium, system, channel, device, wire, cable, fiber, circuit or link to be conveyed to a destination, and the term "communication" as used herein means data so conveyed or delivered. The term "communications" as used herein includes one or more of a communications medium, system, channel, device, wire, cable, fiber, circuit and link.

The term "processor" as used herein means processing devices, apparatus, programs, circuits, components, systems and subsystems, whether implemented in hardware, software or both, and whether or not programmable. The term "processor" as used herein includes, but is not limited to computers, hardwired circuits, signal modifying devices and systems, devices and machines for controlling systems, central processing units, programmable devices, field programmable gate arrays, application specific integrated circuits, systems on a chip, systems comprised of discrete elements and circuits, state machines, virtual machines and combinations of any of the foregoing.

The terms "panelist," "panel member" and "participant" are interchangeably used herein to refer to a person who is, knowingly or unknowingly, participating in a study to gather information, whether by electronic, survey or other means, about that person's activity.

The term "portable user Appliance" (also referred to herein, for convenience, by the abbreviation "PUA") as used herein means an electrical or non-electrical device capable of being carried by or on the person of a user or capable of being disposed on or in, or held by, a physical object (e.g., attaché, purse) capable of being carried by or on the user, and having at least one function of primary benefit to such user, including without limitation, a cellular telephone, a personal digital assistant ("PDA"), a Blackberry device, a radio, a television, a game system (e.g., a Gameboy® device), a notebook computer, a laptop computer, a GPS device, an iPod® device, a DVD player, a walkie talkie, a personal communications device, a telematics device, a remote control device, a wireless headset, a wristwatch, a portable data storage device (e.g., Thumb™ drive), a camera, a recorder, a keyless entry transmitter device, a ring, a comb, a pen, a pencil, a notebook, a wallet, a tool, an implement, a pair of glasses, an article of clothing, a belt, a belt buckle, a fob, an article of jewelry, an ornamental article, a pair of shoes or other foot garment (e.g., sandals), a jacket, and a hat, as well as any devices combining any of the foregoing or their functions.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of corresponding information in a different physical form or forms.

The terms "media data" and "media" as used herein mean data which is widely accessible, whether over-the-air, or via cable, satellite, network, internetwork (including the Internet), print, displayed, distributed on storage media, or by any other means or technique that is humanly perceptible, without regard to the form or content of such data, and including but not limited to audio, video, text, images, animations, databases, files, broadcasts, displays (including but not limited to video displays, posters and billboards), signs, signals, web pages, print media and streaming media data.

The term "presentation data" shall mean media data or content other than media data to be presented to a user.

The term "research data" as used herein means data comprising (1) data concerning usage of media, (2) data concerning exposure to media, and/or (3) market research data.

The effective collection of valid data is enhanced by reliable technical data collection and reliable participant compliance. In various aspects, the present invention includes features that enhance both the quality of technical data collection and the quality of participant compliance.

Figure 1:
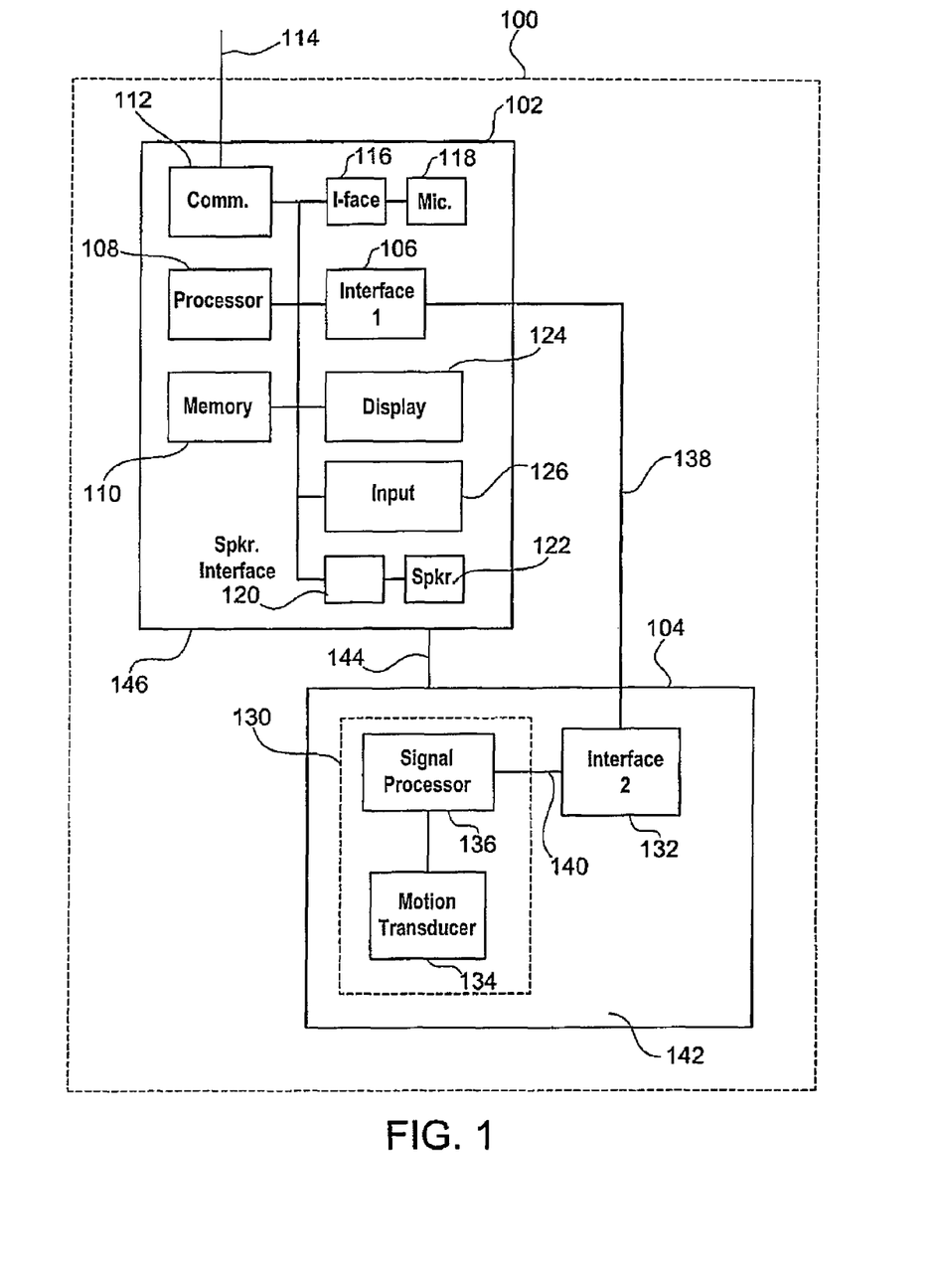
FIG. 1 shows, in block diagram form, a portion of an exemplary data acquisition system including an appliance and a sensor module according to one embodiment of the invention.

One embodiment of a system according to the invention includes a combination of a motion sensor such as an accelerometer module and a Personal User Appliance (hereinafter Appliance) as shown in FIG. 1. It should be noted that while the Appliance shown in FIG. 1 may be a cellular telephone, this illustrative example should be considered in no way limiting. As noted above, one of ordinary skill in the art will understand that a wide variety of devices are readily adaptable for use as an Appliance in the context of the present invention.

FIG. 1 shows a portion of a data acquisition system 100 according to a first embodiment of the invention. The data acquisition system 100 includes an appliance 102 and a sensor module 104. In various embodiments, the sensor module 104 is a discrete subsystem that is removably or permanently attached to the appliance 102. In one embodiment, as illustrated, the appliance 102 is a cellular telephone including a first interface portion 106, a processor portion 108, a memory portion 110, and a communications portion 112 including an antenna 114. In a further aspect, according to the illustrated embodiment, the appliance 102 includes a microphone interface device 116, a microphone 118, a speaker interface device 120 and a speaker 122. In addition, the illustrated appliance 102 includes a display portion 124 and an input portion 126. In various embodiments the display portion 124 includes an LCD screen, or other display device as known in the art. In various embodiments, the input portion 126 includes one or more tactile or non-tactile input devices such as, for example, a key, a joystick, a trackball, a touchpad, an optical sensor, etc., such as are known in the art.

In one embodiment of the invention processor portion 108 includes a commercially available microprocessor device. In various embodiments of the invention, such commercially available microprocessor devices include processor devices from Intel Corporation® and from Texas Instruments, Inc.®. In one embodiment of the invention, the processor portion 108 includes an Intel Xscale CPU®. In another embodiment of the invention, the processor portion 108 includes TI OMAP ARM CPU®. One of skill in the art will appreciate that other appliances including other processor devices would be readily adaptable to use in the present invention.

According to the exemplary embodiment illustrated, the sensor module 104 includes a motion sensor 130 and a second interface device 132. In one embodiment, the first 106 and second 132 interface devices are adapted to be coupled to one another to form a signaling interface 138.

According to one embodiment, the motion sensor 130 includes a motion transducer 134 and a signal processor portion 136. In one embodiment, the signal processor portion includes an analog to digital converter device. In various embodiments, the analog to digital converter device includes one or more of a parallel encoder device, a successive approximation device, a voltage to frequency conversion device, a single-slope integration device and a dual-slope integration device, among others.

In one embodiment, the second interface device 132 is a Secure Digital Input/Output (SDIO) controller. According to one embodiment, the SDIO controller is implemented including an Application-Specific Integrated Circuit (ASIC). An exemplary SDIO controller is available from Arasan Chip Systems, Inc. of San Jose, Calif., such as, for example, the SDIO control identified as AC2200, and similar devices. In various embodiments, the motion sensor module 504 is referred to as a Secure Digital Accelerometer (SDA), and is adapted to be coupled to any device that includes the SDIO Host Controller (SDHC) functionality. One of skill in the art will appreciate that many mobile devices, and especially devices including image capture functionality, now include SDHC functionality.

In a further aspect of the invention, power, such as electrical power is transferred from the appliance 102 to the sensor module 104. In one embodiment, this transfer of power takes place through an interface that is integral to the communications interface 138. According to one embodiment of the invention, the appliance 102 includes an internal power source. In various embodiments, the internal power source includes one or more of a disposable electrochemical battery, a rechargeable electrochemical battery, a fuel cell, a capacitive power storage device, a miniature heat engine such as a micro-electro-mechanical system (MEMS) turbine, a miniature generator such as a hand-crank generator, and a electromagnetic energy capture device such as a photovoltaic device, among others known in the art. In a further embodiment of the invention, the sensor module 104 includes a power storage device.

According to one embodiment of the invention, a further interface 140 between the motion detector 130 and the second interface device 132 includes a multi-master serial computer bus such as an Inter-Integrated Circuit (I2C) interface. In another embodiment, interface 140 is implemented to include a software emulated I2C interface. In a further embodiment, interface 140 is implemented to include a synchronous serial data link such as a Serial Peripheral Interface (SPI), and in still another embodiment interface 140 is implement it to include a software emulated SPI interface. In a further embodiment, interface 140 is implemented including a parallel interface and in another embodiment interface 140 includes a Universal Asynchronous Receiver Transmitter (UART).

A further embodiment of the invention incorporates a Field Programmable Gate Array (FPGA) device to provide SDIO controller functionality between the motion detector 130 and the signaling interface 132.

In various embodiments, the motion transducer 134, signal processor portion 136 and second interface device 132 are mutually mechanically coupled to one another at a substrate 142. In the illustrated embodiment, a further mechanical coupling 144 exists between the appliance 102 and the sensor module 104—for example between the substrate 142 of the sensor module 104 and a case 146 of the appliance 102. According to one embodiment, this coupling includes a mechanical interface according to the "Secure Digital" specification.

In one embodiment of the invention, the motion transducer 134 is an accelerometer such as a single-axis accelerometer, a 2-axis accelerometer or a 3-axis accelerometer. In such an embodiment, the motion transducer is adapted to sense an acceleration of the sensor module 104.

It is known to prepare miniature accelerometers using micro-electro-mechanical systems (MEMS) technology. One exemplary accelerometer device, such as would be employed in one embodiment of the invention, is identified as KXPS5-2050, manufactured by Kionix®, Inc. of Ithaca, N.Y., and similar devices. In one aspect, it is desirable to employ an accelerometer device including an integrated digital interface. For example in one embodiment the accelerometer device includes an integrated analog to digital converter device.

According to one embodiment of the invention, the accelerometer includes an accelerometer having a sensitivity adapted to detecting human motion. For example, in one embodiment of the invention, the accelerometer is adapted to detect between about 0.01 Gravity (G) acceleration and 0.001 G acceleration. In another embodiment of the invention, the accelerometer is adapted to detect between about 1.0 G and 0.001 G acceleration.

In another embodiment of the invention the motion transducer 134 is an alternative motion transducer such as, for example, a ring laser gyroscope. One exemplary ring laser gyroscope is illustrated in U.S. patent application Ser. No. 09/609,262, filed Jun. 30, 2000 and published under the auspices of WIPO as Publication Number WO/2002/001156, the disclosure of which is herewith incorporated by reference in its entirety. One of skill in the art will appreciate that a gyroscope is useful for sensing rotational motion, as opposed to linear acceleration. Like linear acceleration, rotational motion of a device can be indicative of its transportation from place to place. Accordingly, like acceleration, the detection of rotational motion can be useful in verifying compliance, such as transportation of a monitor device, by a survey participant.

Certain appliances include integrated motion detectors in the form of accelerometers. For example, the iphone, and certain other smart phones include accelerometers for detecting device acceleration. It will be understood by one of skill in the art, however, that the ability to add a supplemental motion detector device to an appliance, including an appliance that has an integrated accelerometer and an appliance that has no integrated accelerometer, has particular and surprising value in the field of evaluating survey compliance. Accordingly, the present invention includes a variety of embodiments directed to providing a supplemental motion detector to an appliance that may or may not have further motion detecting capability.

It is also understood that a variety of prototype hardware devices are available for coupling an external accelerometer to a cellular phone. For example, a device identified as "Turbo Motion"™ automobile alarm is presented at www.bladox.com. This device provides an accelerometer equipped mobile phone accessory for movement detection and is adapted to couple an accelerometer to a mobile phone for purposes of automobile and bicycle theft detection. The accelerometer communicates with the mobile phone through a SIM interface of the telephone.

In a further example a phone system interface (PSI) board, including an accelerometer, adapted for coupling to an MMC/SD port is described in "The PSI board: Realizing a Phone-Centric Body Sensor Network (Trevor Pering et al.).

Figure 2:
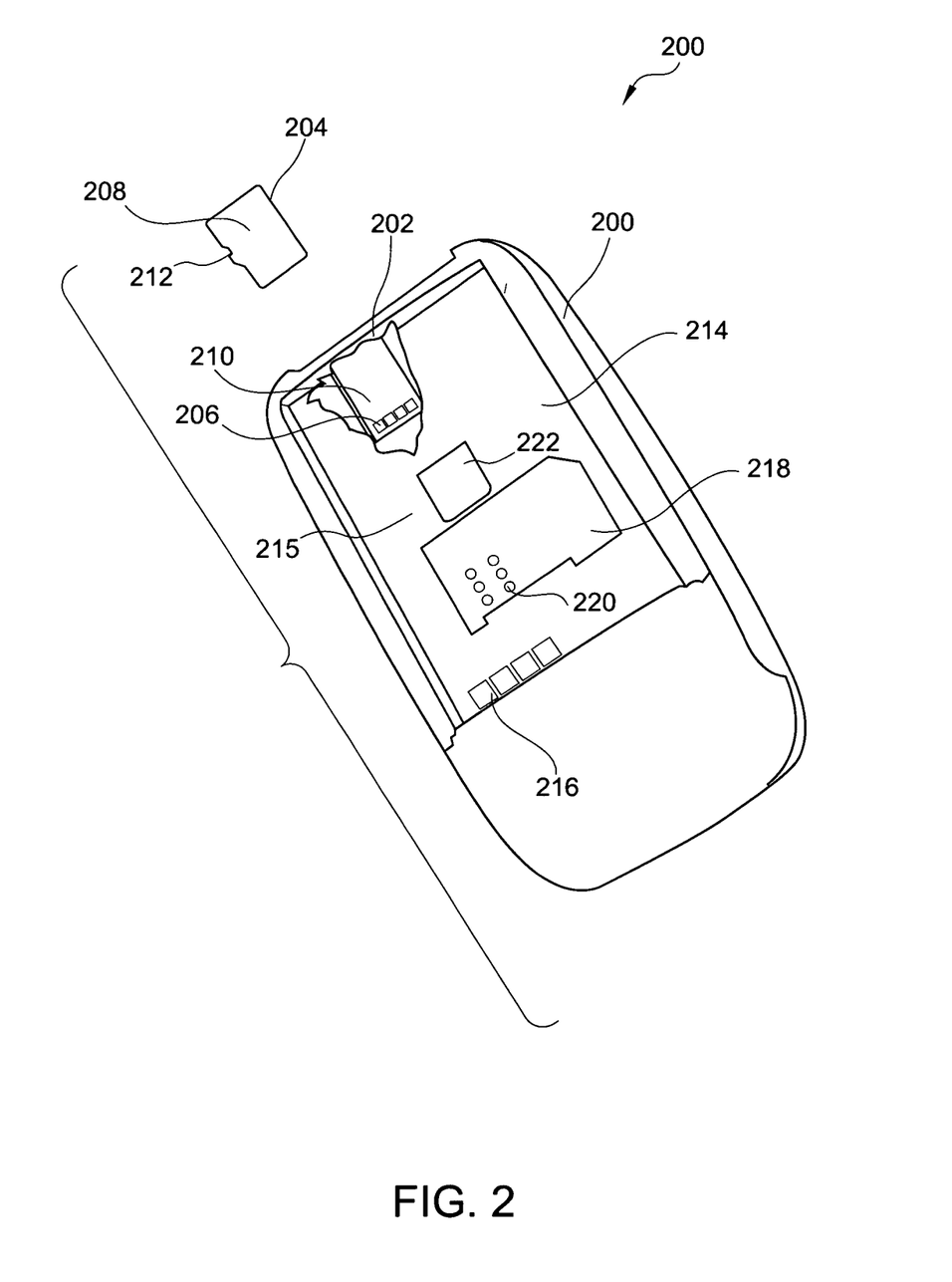
FIG. 2 shows, in cutaway perspective view, an exemplary cell phone appliance according to one embodiment of the invention.

FIG. 2 shows, in cutaway perspective view, a portion of a cellular telephone 200 including a receptacle 202 for receiving an SD card 204. One of skill in the art will appreciate that the illustration of FIG. 2 is schematic, and is simplified in various details as compared to an actual SD interface, for clarity of representation. The receptacle includes a plurality of contacts 206 adapted to interface with corresponding contacts of SD card 204. External surfaces e.g., 208 of the SD card are adapted to be disposed adjacent to, and supported by, corresponding internal surfaces, e.g., 210 of receptacle 202. A detent mechanism, not shown, is adapted to be coupled with a notch 212, or other feature of SD card 204, so as to removably retain SD card 204 within receptacle 202.

In the illustrated embodiment, the receptacle 202 is disposed inwardly of a surface 214 of a battery compartment 215 of the cellular phone 200. As illustrated, the battery compartment includes a plurality of power contacts, e.g., 216 adapted to couple the cell phone to a battery or other power source. A further receptacle 218 disposed within surface 214 is adapted to receive a SIM card therewithin, and includes a further plurality of contacts, e.g., 220 therewithin. It should be noted that a further detent mechanism, 222 is adapted to retain the SIM card in an operative position and orientation.

According to one embodiment of the invention, the elements of a sensor module, e.g., 104 as shown in FIG. 1 are incorporated into an SD card, e.g. 204, as shown in FIG. 2. Second interface device 128, of FIG. 1 includes a plurality of electrical contacts adapted to be electrically coupled to contacts 206 of FIG. 2. Accordingly, an operative insertion of SD card 204 into receptacle 202 of cell phone 200 allows the processor 108 to receive a signal corresponding to an acceleration of the cell phone 200, as detected by motion transducer 124. According to one embodiment of the invention, insertion of the SD card 204 into receptacle 202 results in plug-and-play activation of the SD card 204.

Figure 3A:
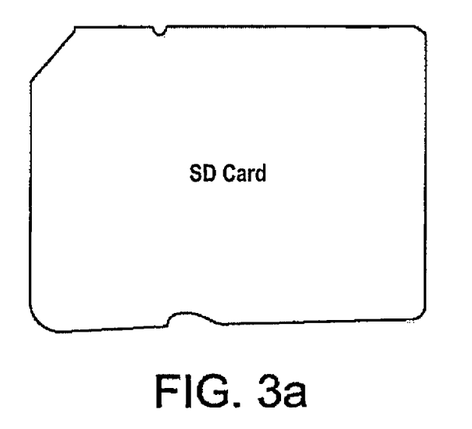
FIGS. 3A-3C show, in schematic outline form, exemplary SD sensor module cards according to one embodiment of the invention.
Figure 3B:
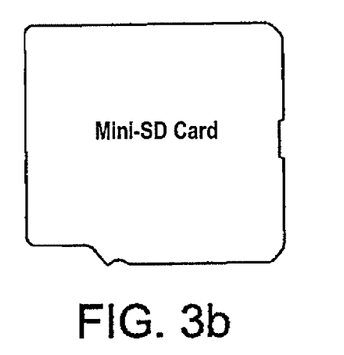
Figure 3C:
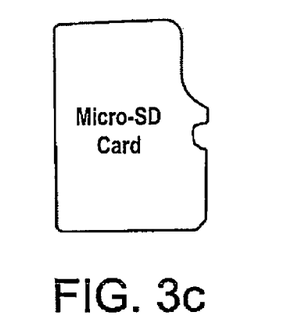

Presently at least three varieties of SD card are in common use. These include the SD card, the mini-SD card and the micro-SD card as illustrated in FIGS. 3a, 3B and 3C respectively. It should be understood that the present invention can, in various embodiments, the implemented according to any of the SD card, the mini-SD card, and the micro-SD card, as well as in any alternative technology that is, or may become, available in the art for appropriately coupling a motion transducer device to an appliance.

Figure 4:
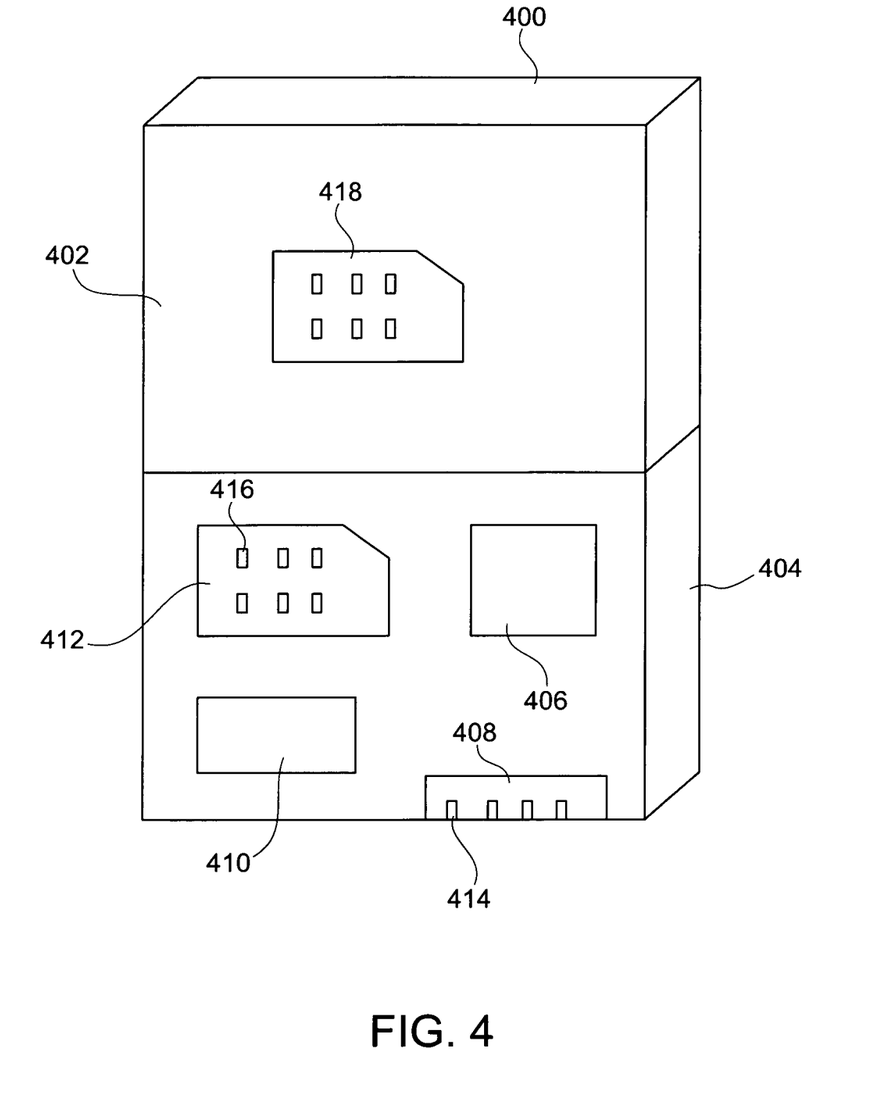
FIG. 4 shows, in perspective view, a sensor module adapted to be disposed in a battery compartment of an appliance according to one embodiment of the invention.

FIG. 4 shows a portion of a further embodiment of the invention including a motion detector module 400 adapted to be received in a battery compartment of an appliance such as battery compartment 215 of cellular phone 200 of FIG. 2. The motion detector module 400 includes a power supply device 402 such as, for example, a rechargeable battery. A casing portion 404 of the power supply device 402 is adapted to support a motion detector device 406 a power interface portion 408, a communications device 410 and a data interface portion 412. The power interface portion 408 and data interface portion 412 include respective contact devices, e.g., 414, 416. The power interface contact devices, e.g. 414, are adapted to be operatively electrically coupled to corresponding power contacts (e.g. 216 as shown in FIG. 2). The data interface contact devices, e.g. 416, are adapted to be operatively electrically coupled to corresponding data contacts (e.g. 220 as shown in FIG. 2).

According to one embodiment, the motion detector module 400 includes a SIM receptacle 418 adapted to receive a SIM card therewithin. In another embodiment, the motion detector module 400 includes a SIM device including, for example, flash memory permanently integrated into the module 400. In one embodiment, the flash memory is flash memory complying with the Universal Flash Storage (UFS) specification. In one embodiment of the invention, access to the discrete or integrated in device is transparent to the appliance through the motion detector module 400.

Figure 5:
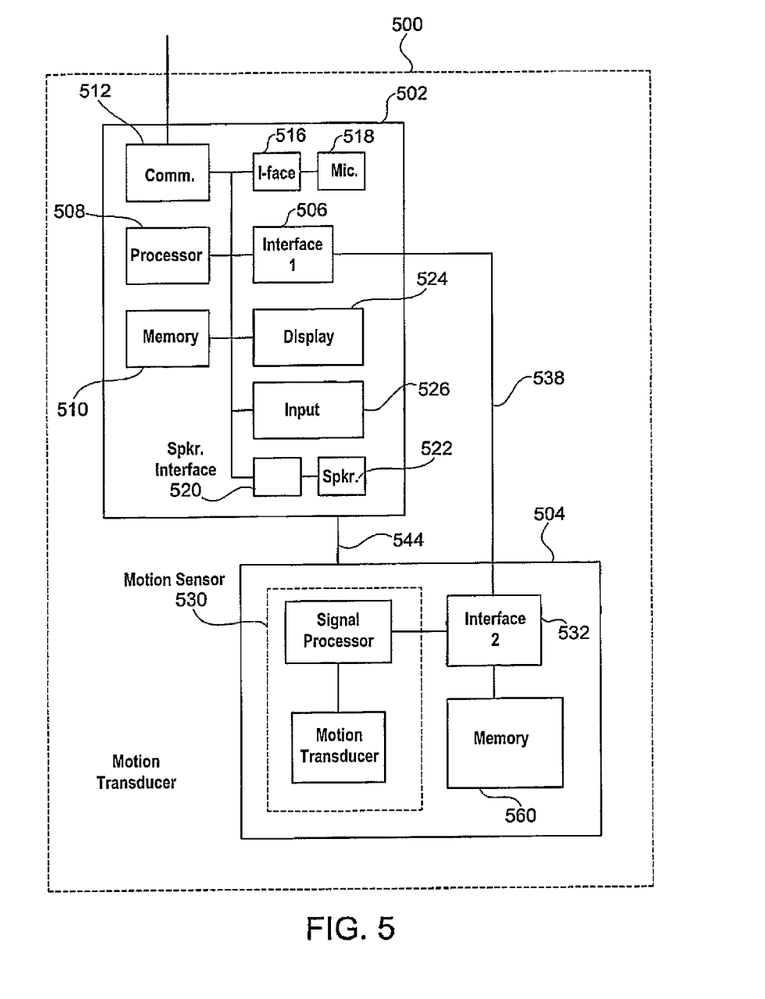
FIG. 5, in block diagram form, a portion of an exemplary data acquisition system including a sensor module with a memory device according to one embodiment of the invention.

FIG. 5 shows a further embodiment of the invention including a portion of a data acquisition system 500. Like data acquisition system 100 of FIG. 1, data acquisition system 500 includes an appliance 502 and a sensor module 504. As shown, the appliance 502 includes a first interface portion 506, a processor portion 508, a memory portion 510, and a communications portion 512. Also included are a microphone interface device 516, a microphone 518, a speaker interface device 520, a speaker 522, a display portion 524 and an input portion 526.

As illustrated, the sensor module 504 includes a motion sensor 530, a second interface device 532 and a memory device 560. In various embodiments, memory device 560 includes one or more of a RAM memory device, a ROM memory device, a PROM memory device (such as for example an EEPROM memory device) and a flash memory device. In a further embodiment of the invention, the memory device includes an MRAM memory device and in still another embodiment, the memory device includes a phase change memory device. In other embodiments, any appropriate computer readable medium, as known in the art, may be included in the memory device 560.

In various embodiments, memory device 560 is adapted to change state so as to receive and store data including a computer program. In one embodiment, the memory device is adapted to store identification information such as a model number or a serial number identifying a type of sensor module 504 or a particular individual module 504 respectively. In a further embodiment of the invention, memory device 504 is adapted to receive and store data from the appliance 502. For example, in one embodiment, memory device 560 is adapted to receive data representing a still or moving photograph captured by an image capture device of the appliance 502. In another embodiment, memory device 560 is adapted to store data representing an audio signal recorded by an audio recording functionality of the appliance 502. In still other embodiments, memory device 560 is adapted to receive and store data generated by, or entered into the appliance 502 such as, for example, one or more of contact information data, mnemonic data, calendar data, etc.

According to one embodiment of the invention, access to a storage facility of memory device 560 by appliance 502 for an otherwise available function is transparent to the appliance 502. In such an embodiment, the appliance 502 is able to access, for example, flash memory within the sensor module 504 using a protocol identical to that which would be employed to access memory within any other or generic flash memory SD card.

In one embodiment, the processor portion 508 of the appliance 502 is adapted to receive a signal corresponding to the computer program and to responsively execute a computer operation. According to one embodiment of the invention, this information is received from memory device 560 where, in one embodiment, it is stored in binary format. In a further embodiment, information stored within memory device 560 is encrypted according to encryption methods known in the art. In one embodiment, information is received at processor 508 from memory device 560 by way of memory device 510. In one embodiment, the encrypted information includes all or a portion of a mission-critical data acquisition software including, audio watermark decoding software. In one embodiment, the combination of the appliance 502 and sensor module 504 is adapted for acquiring data for media rating purposes.

In one embodiment, data and/or program information received at processor 508 from memory device 560 includes device driver program information. In one embodiment of the invention, the device driver program information includes Microsoft Windows CE® operating system compatible device driver program information. In another embodiment of the invention the device driver program information includes Microsoft Mobile 2003® operating system compatible device driver program information. In still another embodiment of the invention the device driver program information includes Linux operating system compatible device driver program information, or a device driver program compatible with an alternative UNIX based operating system or other operating system.

According to one embodiment of the invention a transfer of information from the memory device 560 to the processor device 508 is controlled by an interface 538 formed by cooperation of interface devices 532 and 506. In one exemplary embodiment, interface device 532 is an SDIO processor that, in cooperation with interface device 506, controls both motion sensor 530 and memory device 560. In still another embodiment of the invention, interface device 532 is a general-purpose microcontroller and in another embodiment a general-purpose microprocessor device.

According to one embodiment of the invention, a data signal, including a computer program, received at processor device 508 from memory device 560 is operative to control a computer operation of processor device 508. Thus one of skill in the art will appreciate that either a specialized or an otherwise conventional appliance 502, such as a cell phone, can be coupled at an interface, such as a standard SD interface to a sensor module 504. According to one embodiment of the invention, this coupling is effected by a user of no particular technical expertise, which user inserts an SD card including sensor module 504 into an otherwise conventional SD slot of the appliance 502.

Upon receipt of the SD card module 504 into the SD slot of the appliance 502, a communication of signals is initiated between processor 508 and memory device 560. Responsive to this communication of signals, information (for example data and/or program information) is received at processor 508 from memory device 560. According to one embodiment of the invention, the data and/or program information is first received at memory device 510 from memory device 560 and thereafter received, in whole or in part, at processor 508 from memory device 510. According to one embodiment of the invention, the transfer of data and/or program information takes place according to a master/slave relationship in which the appliance 502 serves as master device and the sensor module 504 serves as slave device. According to another embodiment of the invention, the transfer of data and/or program information takes place according to a master/slave relationship in which the appliance 502 serves as slave device, the sensor module 504 serves as master device and the interface 538 may or may not be an SD interface.

In one embodiment of the invention a first computer program is operative to control processor 508 prior to receipt of data and/or program information at processor 508 from memory device 560. Thereafter, in one embodiment of the invention a combination of the first computer program and the received data and/or program information is operative to control the processor 508. In a further embodiment, after receipt of the data and/or program information at processor 508, the received data and/or program information assumes complete control of the processor 508.

In one embodiment of the invention encrypted data and/or program information stored in memory device 560 is decrypted at interface device 532. In a further embodiment of the invention, encrypted data and/or program information stored in memory device 560 is decrypted at interface device 506 and in still further embodiments of the invention, encrypted data and/or program information stored in memory device 560 is decrypted at processor 508 or in a further device, such as a dedicated decryption device.

According to one embodiment of the invention, decryption of data/and/or program information from memory device requires entry of a decryption key value by a user. For example, in one embodiment a decryption key value is entered by a user into an interface device of an appliance such as user input device 526 of embodiment 500 as shown in FIG. 5. In another embodiment of the invention, decryption key information is received at communication portion 512 from a remote location. Accordingly, operation of a sensor module according to the invention can be controlled by the provision of an encryption key value to a survey participant or automatically by transmission of an encryption key value to a sensor-equipped appliance, for example.

In one embodiment of the invention, data and/or program information received at processor 508 from memory device 560 is operative to control a communication of a motion sensor signal from motion sensor device 530 to processor 508. According to one embodiment, the motion sensor signal includes a motion/no-motion signal. In a further embodiment of the invention, the motion sensor signal includes information related to a magnitude and/or a duration of at least one motion or acceleration of motion sensor device 530.

According to a further embodiment of the invention, data and/or program information received at processor 508 from memory device 560 is operative to control a user interface activity of processor 508. For example, data and/or program information received at processor 508 from memory 560 is operative to control a text output, a graphical output, or a combined text and graphical output displayed on display device 524. In one embodiment of the invention, real-time data, such as accelerometer data, received from the motion sensor device 530 is displayed on display device 524. In a further embodiment, data and/or program information received at processor 508 from memory device 560 is operative to control an audible or inaudible output from speaker 522. In a still further embodiment data and/or program information received at processor 508 from memory device 560 is operative to control a receipt of input information entered by a user at input device 526 and, in still further embodiments, to control a receipt of an audible or in audible sonic signal at microphone 518.

According to one embodiment of the invention, a signal related to an output of motion sensor device 530 is transmitted from communication portion 512 and received, for example through a telephone network or other communications network, at a remote location. Responsively, a reward signal or other indication related to participant compliance is displayed on display device 524. In another embodiment of the invention, a reward signal or other indication related to participant compliance is produced in the form of an audible output by speaker device 518. Advantageously, in various embodiments, the sensor module is adapted to be disposed entirely within the appliance, such that use of the appliance including the sensor module is substantially indistinguishable from use of the appliance without the sensor module. That is, inclusion of the sensor module does not discourage a survey participant from carrying the appliance, and may encourage the survey participant to carry the appliance so that valid survey data acquisition can be acquired.

In a further aspect, a data signal received at processor 508 from memory device 560 is operative to identify a particular sensor module 504 to appliance 502 and/or to the data acquisition system 500 more generally. Thus, one of skill in the art will appreciate that, in one embodiment, sensor module 504 is adapted to be readily removed from a first appliance 502 and inserted for operative interface into a second compatible appliance, whereupon the second compatible appliance forms a portion of the data acquisition system 500.

In one embodiment of the invention, a state of memory device 560 is changed to store a record of a motion signal produced by motion Sensor 530. Accordingly, in some embodiments, a motion history is stored in memory device 560 until sometime after a motion is sensed by the motion sensor 530. Thereafter, a further signal corresponding to this stored motion history is received at processor 508 from memory device 560. In still another embodiment of the invention, motion data stored in memory device 560 is received by a further device after the sensor module 504 is removed from appliance 502.

According to still another embodiment of the invention, environmental signal data, received for example by way of microphone 518 is stored in memory device 560. Thereafter, environmental signal data and motion data are both retrieved from memory device 560, either by way of processor 508, or by removing module 504 from appliance 502 and transferring data from memory device 560 to a further device.

As disclosed above, one will appreciate the beneficial aspects of being able to operate sensor module 504 in conjunction with a plurality of different appliances 502. In various circumstances, making sensor module 504 operative with different appliances will increase a likelihood of participant compliance, i.e., the likelihood that a participants will carry the module on or about his or her person during a particular data acquisition time interval.

Figure 6A:
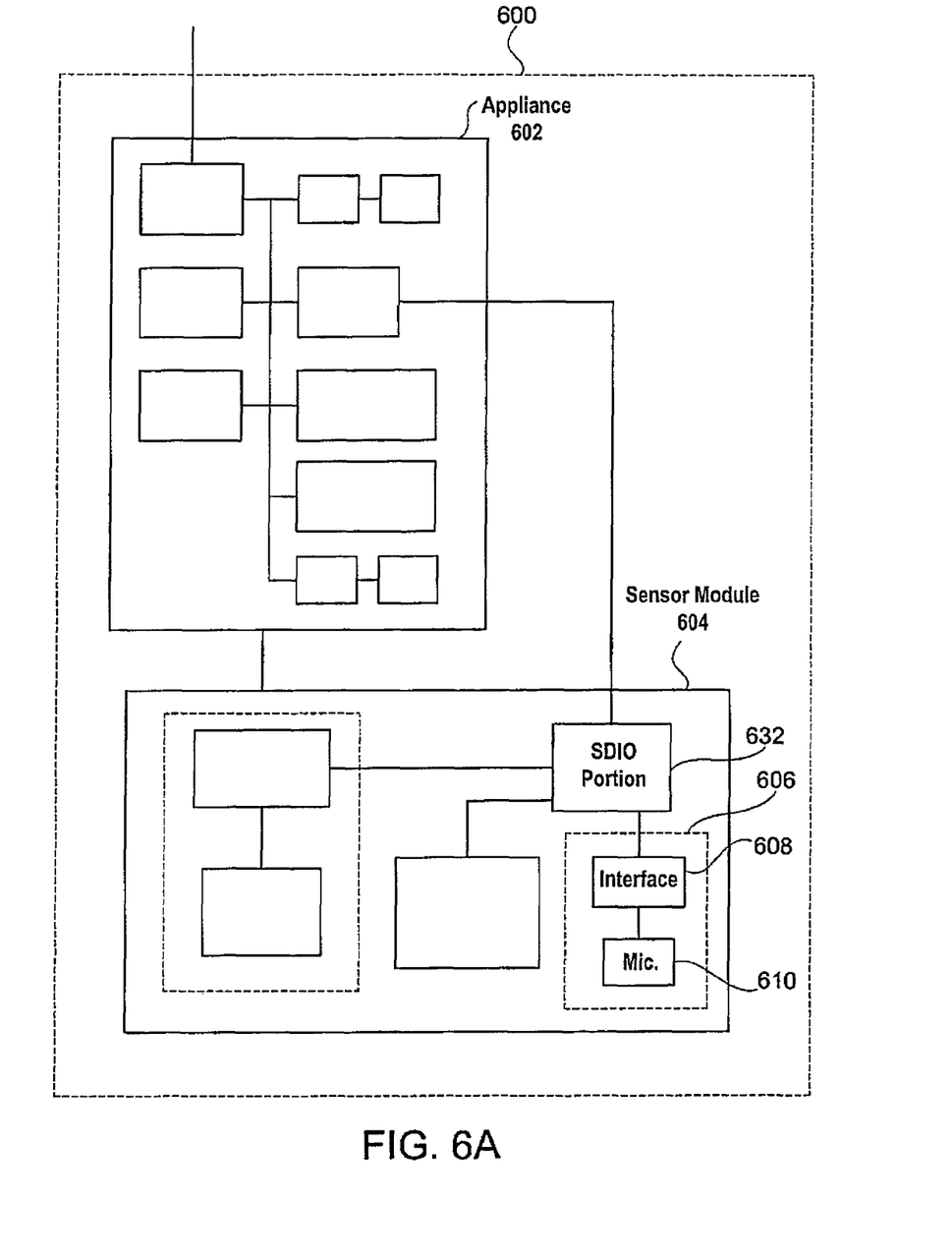
FIG. 6A shows, in block diagram form, a portion of an exemplary data collection including a sensor module with an environmental sensor signal sensor such as a microphone.

FIG. 6A shows, in block diagram form, a portion of a further embodiment 600 of the invention including an appliance 602 and a sensor module 604. This sensor module 604 includes and environmental signal input device 606. In one embodiment, the environmental signal input device 606 includes a microphone interface device 608 and a microphone 610. According to the illustrated embodiment, the microphone 610 is signalingly coupled to an interface device 632 through microphone interface device 608. According to one embodiment of the invention, the microphone 610 includes a MEMS microphone device. In one embodiment of the invention, microphone 610 includes a plurality of transducer devices. In a further embodiment of the invention microphone interface device 608 includes an analog to digital converter device. In the illustrated embodiment, the other components of appliance 602 and sensor module 604 correspond to those illustrated in, for example, embodiment 500 of FIG. 5. In various embodiments, the environmental signal input device 606 is adapted to receive an audible or inaudible sonic signal, an optical signal, a radio frequency signal and a microwave signal or other environmental signal, respectively.

Figure 6B:
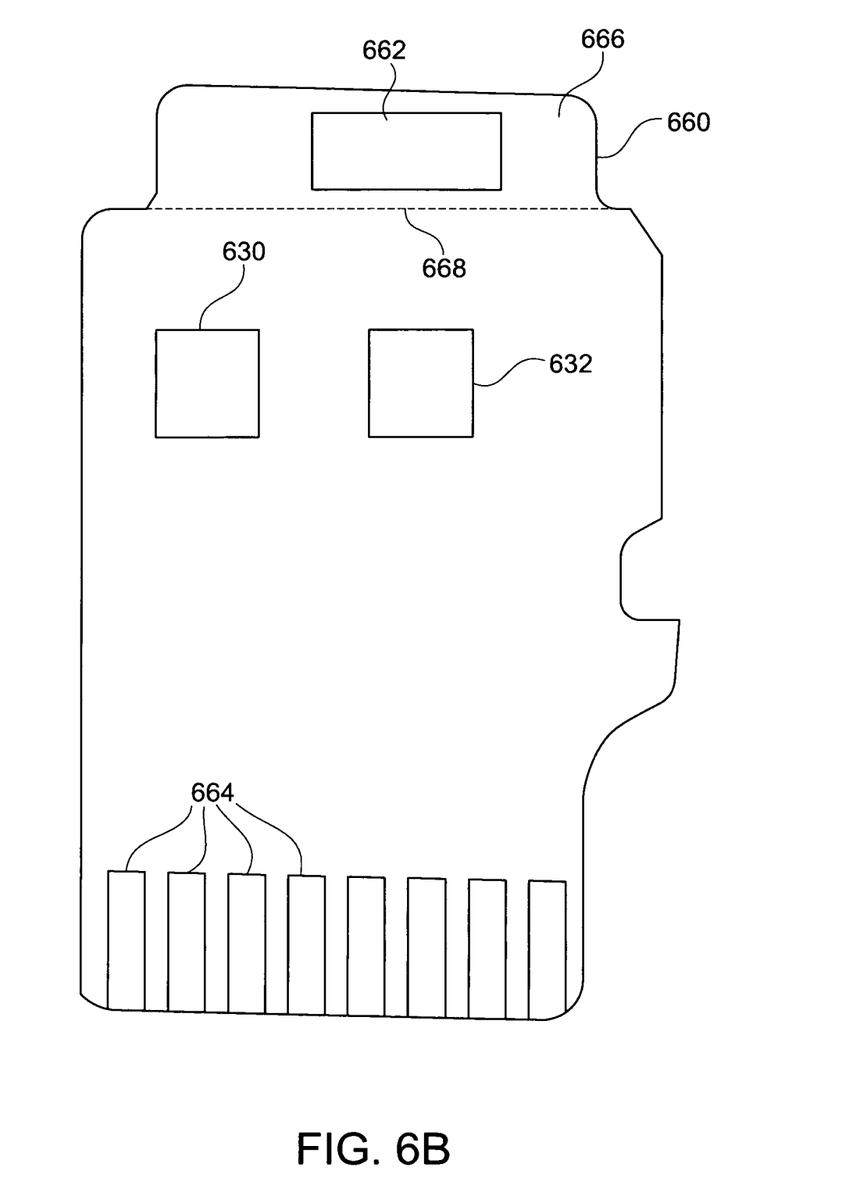
FIG. 6B shows an exemplary SD card sensor module including an environmental signal sensor such as a microphone.

FIG. 6B shows a portion of one embodiment of the invention including an SD card 660 (here a micro SD card, although this is merely exemplary) having an SDIO portion 632, a motion sensor portion 630 (illustrated as an accelerometer portion) and a microphone portion 662. Also illustrated are exemplary SDIO contacts 664. According to the illustrated embodiment the SD card includes an extension portion 666 disposed outwardly of a conventional perimeter 668 of an SD card. The microphone portion is disposed on the extension portion and is consequently advantageously positioned to receive an environmental sonic signal during operation of the SD card.

Referring again to FIG. 5, in other embodiments, the combination of the appliance 502 and sensor module 504 are operative to motivate compliance by, for example, outputting an audible or visual alarm signal in response to particular environmental conditions. For example, in one embodiment and audible alarm is generated by speaker 522 when motion sensor 530 does not detect motion above a certain threshold during a particular time interval. One such compliance motivation operation is illustrated in FIG. 7.

Figure 7:
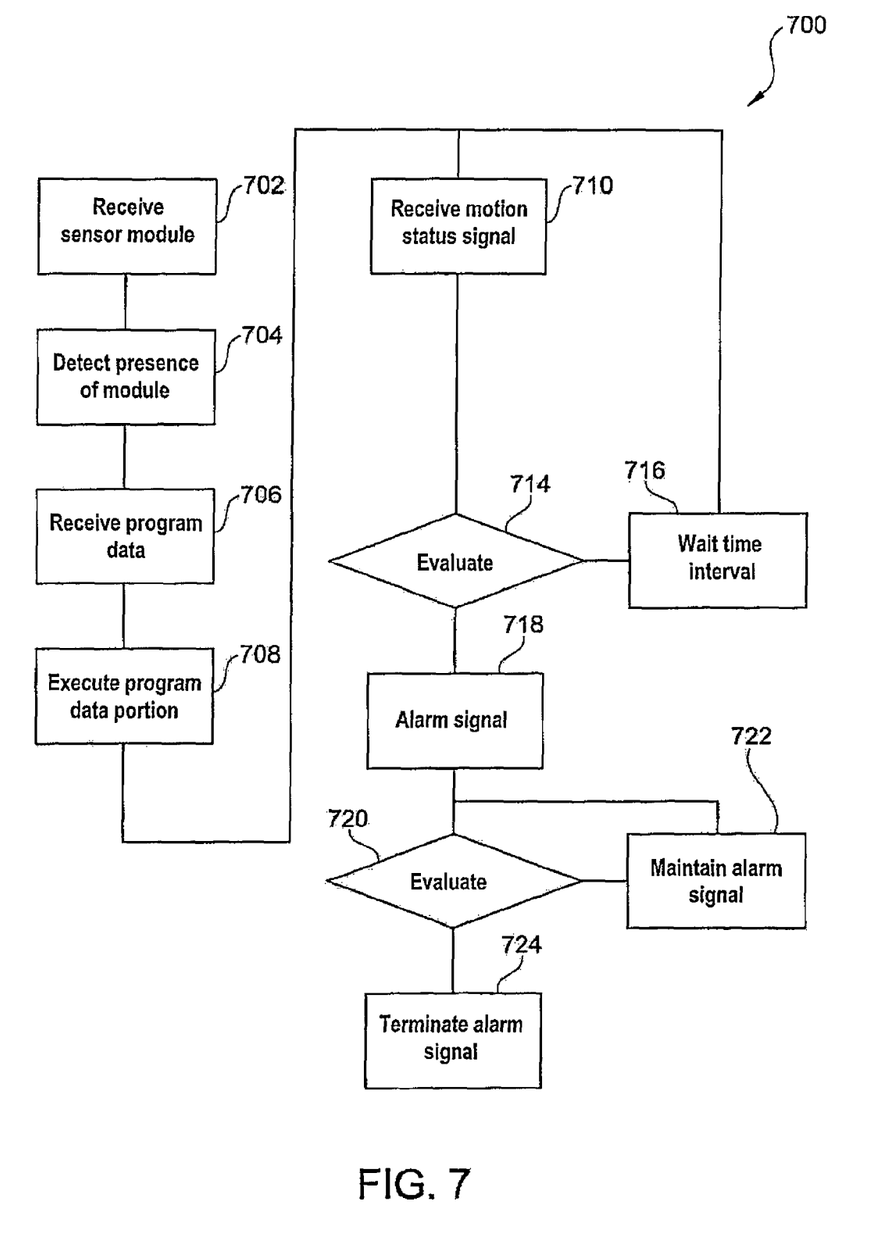
FIG. 7 shows, in flowchart form, a portion of an operation of a data acquisition system according to one embodiment of the invention.

FIG. 7 illustrates, in flowchart form, an exemplary operation 700 of a data acquisition system according to one embodiment of the invention. According to operation 700, a sensor module (like module 504 of embodiment 500, for example) is received 702 into a slot of an appliance 502. Processor 508 detects 704 the presence of the module in the slot and initiates communication between processor 508 and memory device 560. In other embodiments, communication is initiated by another device, such as, a device within sensor module 504. Thereafter, data, including program data is received 706 at processor 508 from memory device 560. The motion sensor 504 produces a motion status signal corresponding to acceleration or other characteristic motion of the sensor. The processor 508 executes 708 a portion of the program data and responsively receives 710 the motion status signal to detect motion status of the motion sensor 504.

The processor evaluates 714 the motion status signal. If this evaluation indicates that the sensor module 504 has experienced motion, the processor waits 716 for a particular time interval and then receives and evaluates a further motion status signal, repeating the cycle. If evaluation 714 of the motion status signal indicates that the sensor module 504 has not detected motion (indicating noncompliance) the processor 508 causes an alarm signal to be output 718.

During output of the alarm signal the processor 508 evaluates additional information 720 to determine whether an alarm termination event has occurred. For example, if the sensor module 504 detects motion, this would constitute an alarm termination event in some embodiments. If no alarm termination event is detected, the alarm signal is maintained for a particular time interval 722. Thereafter, the processor 508 evaluates again for an alarm termination event. According to one embodiment of the invention, if an alarm termination event is detected, the processor 508 acts to terminate 724 the alarm signal. In one embodiment of the invention, the duration of alarm signal output is limited to a particular fixed or adjustable maximum time.

In various embodiments of the invention, supplementary factors are evaluated prior to or during the alarm output. For example, in one embodiment of the invention, motion status is repeatedly evaluated subsequent to the receipt of a negative motion status signal and prior to the output of an alarm signal. In another embodiment of the invention, the motion status signal is evaluated in conjunction with a chronological time signal generated either by the appliance 502 or the sensor module 504. Thus, for example, even when motion is absent, an alarm signal is generated only during certain hours of the day. In one embodiment, an alarm signal is generated only during what would be waking hours of a survey participant. In another embodiment, an alarm signal is generated only during likely departure hours went a survey participant is likely to leave home or leave work. In still another embodiment of the invention, parameters of a chronological time signal are adjustable by a survey participant using, for example, input device 526 of appliance 502.

In various embodiments of the invention, a reward or other motivation is provided to a survey participant based on a confirmation of compliance provided by a sensor module according to the present invention. In various embodiments, such a reward includes, for example, a partial or total discount of a fee associated with operation of an appliance. In one example free cell phone minutes are provided. In another example Internet access is provided. In still another embodiment reward points are provided, the reward points being redeemable for valuable consideration. One of skill in the art will appreciate a wide variety of reward systems are compatible with, and fall within the scope of, the present invention.

In various embodiments, the invention includes preparing a sensor module including receiving a device substrate, such as, for example, an SD device substrate, receiving an integrated accelerometer device, receiving an integrated SDIO controller device, mechanically coupling the integrated accelerometer device to the substrate, mechanically coupling the SDIO controller device to the substrate, signalingly coupling the integrated accelerometer device to the SDIO device and signalingly coupling the SDIO device to a contact device of the device substrate. In a further embodiment of the invention, a memory device is received and mechanically coupled to the substrate. In one embodiment, the memory device is directly coupled to the SDIO controller device and in another embodiment of the invention, the memory device is indirectly coupled to the SDIO controller device.

While the exemplary embodiments described above have been chosen primarily from the field of media consumption research systems, one of skill in the art will appreciate that the principles of the invention are equally well applied, and that the benefits of the present invention are equally well realized in a wide variety of other research systems including, for example, environmental chemical, biological and/or radiological agent sensing systems. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. A method, comprising:
    obtaining a motion status signal from a motion sensor of an insertable storage card to be insertably coupled to a portable device;
    conveying the motion status signal to a communication controller of the insertable storage card, wherein the motion sensor and the communication controller are disposed on a body of the insertable storage card to be insertably coupled to the portable device;
    capturing an audio signal via a microphone disposed on an extension portion of the insertable storage card;
    conveying the motion status signal to a processor of the portable device, wherein the processor is to determine if the motion status signal represents a characteristic motion of the motion sensor to validate at least a portion of media measurement data collected via the portable device.

2. The method of claim 1, wherein the motion sensor comprises an accelerometer.

3. The method of claim 2, wherein the motion sensor comprises a three-axis accelerometer.

4. The method of claim 1, wherein the communication controller comprises a Secure Digital Input/Output (SDIO) controller.

5. The method of claim 1, wherein the insertable storage card comprises a mini card.

6. The method of claim 1, wherein the insertable storage card comprises a micro card.

7. An insertable storage card, comprising:
    a motion sensor, disposed on a body portion of the insertable storage card, to capture a motion status signal;
    an audio sensor, disposed on an extension portion of the insertable storage card extending from the body portion, to capture an audio signal from an environment;
    a communication controller, disposed on the body portion of the insertable storage card, to receive the motion status signal and the audio signal, wherein the communication controller is to transmit data to a portable device to which the insertable storage card is insertably coupled, the portable device to evaluate the motion status signal to determine if the motion status signal represents a characteristic motion of the motion sensor, wherein the characteristic motion is used to indicate a validity of at least a portion of media measurement data collected via the portable device.

8. The insertable storage card of claim 7, wherein the motion sensor comprises an accelerometer.

9. The insertable storage card of claim 8, wherein the accelerometer comprises a three-axis accelerometer.

10. The insertable storage card of claim 7, wherein the communication controller comprises a Secure Digital Input/Output (SDIO) controller.

11. The insertable storage card of claim 7, wherein the insertable storage card comprises a mini card.

12. The insertable storage card of claim 7, wherein the insertable storage card comprises a micro card.

13. The insertable storage card of claim 7, further comprising a memory device.

14. The insertable storage card of claim 13, wherein the memory device comprises a flash memory device.

15. The insertable storage card of claim 13, wherein the memory device comprises an EEPROM memory device.

16. The insertable storage card of claim 13, wherein the memory device is to assume a computer readable data state, the data state representing a stored data value.

17. The insertable storage card of claim 16, wherein the stored data value comprises a program data value.

18. The insertable storage card of claim 16, wherein the stored data value comprises an identity value.

19. The insertable storage card of claim 18, wherein the identity value comprises a serial number.

20. The insertable storage card of claim 16, wherein the stored data value comprises an encrypted stored data value.

21. The insertable storage card of claim 20, wherein the portable device is to receive an encryption key at a communications portion.

22. The insertable storage card of claim 20, wherein the portable device is to receive an encryption key at an input device.

23. The insertable storage card of claim 13, wherein the memory device is to store a device driver program.

24. The insertable storage card of claim 7, wherein the portable device is to display a reward indication on a display device.

25. The insertable storage card of claim 7, wherein the portable device is to output an alarm signal responsive to information associated with the motion status signal.

26. The insertable storage card of claim 7, wherein the extension portion extends from a perimeter of the body portion.

* * * * *